United States Patent
Kawamura (10) Patent No.: US 10,042,455 B2
(45) Date of Patent: Aug. 7, 2018

(54) DETECTING SENSOR HAVING POSITION DETECTION AND PRESSING FORCE DETECTION ELECTRODES

(71) Applicant: Murata Manufacturing Co., Ltd., Nagaokakyo-shi, Kyoto-fu (JP)

(72) Inventor: Hideki Kawamura, Nagaokakyo (JP)

(73) Assignee: MURATA MANUFACTURING CO., LTD., Nagaokakyo-Shi, Kyoto-Fu (JP)

(*) Notice: Subject to any disclaimer, the term of this patent is extended or adjusted under 35 U.S.C. 154(b) by 123 days.

(21) Appl. No.: 15/053,003

(22) Filed: Feb. 25, 2016

(65) Prior Publication Data
US 2016/0170543 A1 Jun. 16, 2016

Related U.S. Application Data (63) Continuation of application No. PCT/JP2014/074620, filed on Sep. 18, 2014.

(30) Foreign Application Priority Data

Sep. 20, 2013 (JP) ................. 2013-194864

(51) Int. Cl.
*G06F 3/044* (2006.01)
*G06F 3/041* (2006.01)
(Continued)

(52) U.S. Cl.
CPC ........ *G06F 3/0414* (2013.01); *G06F 3/03547* (2013.01); *G06F 3/044* (2013.01);
(Continued)

(58) Field of Classification Search
CPC ...................................................... G06F 3/044
See application file for complete search history.

(56) References Cited

U.S. PATENT DOCUMENTS

2003/0024328 A1* 2/2003 Okada .................. B81B 3/0021
73/862.626
2008/0094355 A1 4/2008 Taniguchi et al.
(Continued)

FOREIGN PATENT DOCUMENTS

| | | |
|---|---|---|
| CN | 102004573 A | 4/2011 |
| JP | 2006-178742 A | 7/2006 |

(Continued)

OTHER PUBLICATIONS

International Search Report issued for PCT/JP2014/074620, dated Dec. 9, 2014.
(Continued)

*Primary Examiner* — Sanghyuk Park
(74) *Attorney, Agent, or Firm* — Arent Fox LLP (57) ABSTRACT

A detecting sensor is disclosed that includes position detection electrodes provided on a surface of a board which has flexibility, and are provided at a distance in a planar direction. Furthermore, the detecting sensor includes an insulator film provided on the surface of the board that covers the electrodes; pressing force detection electrodes provided on a back surface of the board; and a pressing force detection electrode provided to oppose to the electrodes with a gap therebetween. Consequently, it is possible to provide the detecting sensor that can reliably receive a user's input operation and precisely detect a pressing position and a pressing force.

19 Claims, 5 Drawing Sheets

(51) Int. Cl.
*G06F 3/0354* (2013.01)
*H01H 3/02* (2006.01)
(52) U.S. Cl.
CPC .. *G06F 3/0416* (2013.01); *G06F 2203/04105* (2013.01); *H01H 2003/0293* (2013.01); *H01H 2239/006* (2013.01); *H01H 2239/074* (2013.01)

(56) References Cited

U.S. PATENT DOCUMENTS

| | | | |
|---|---|---|---|
| 2009/0135157 A1* | 5/2009 | Harley | G06F 3/0416 345/174 |
| 2010/0263633 A1 | 10/2010 | Nakayama et al. | |
| 2011/0304567 A1 | 12/2011 | Yamamoto et al. | |
| 2012/0086671 A1 | 4/2012 | Brown et al. | |
| 2012/0098788 A1 | 4/2012 | Sekiguchi | |
| 2012/0182261 A1 | 7/2012 | Wang et al. | |
| 2012/0229150 A1 | 9/2012 | Inai | |
| 2016/0041636 A1* | 2/2016 | Yun | G06F 3/044 349/12 |

FOREIGN PATENT DOCUMENTS

| | | |
|---|---|---|
| JP | 2010-534899 A | 11/2010 |
| JP | 2011-248439 A | 12/2011 |
| JP | 2011-256043 A | 12/2011 |
| JP | 2012089060 A | 5/2012 |
| JP | 2012-168571 A | 9/2012 |
| JP | 2012-190234 A | 10/2012 |

OTHER PUBLICATIONS

Written Opinion of the International Searching Authority issued for PCT/JP2014/074620, dated Dec. 9, 2014.

* cited by examiner

DETECTING SENSOR HAVING POSITION DETECTION AND PRESSING FORCE DETECTION ELECTRODES

CROSS REFERENCE TO RELATED APPLICATIONS

The present application is a continuation of PCT/JP2014/074620 filed Sep. 18, 2014, which claims priority to Japanese Patent Application No. 2013-194864, filed Sep. 20, 2013, the entire contents of each of which are incorporated herein by reference.

TECHNICAL FIELD

The present invention relates to a detecting sensor that detects an input position and a pressing force, and a touch input device.

BACKGROUND

Patent Literature 1 discloses as an input device of an electronic device a capacitance input device which detects a pressing position and a pressing force by using a change in capacitance produced between electrodes when one of opposing electrodes is pressed. The input device described in Patent Literature 1 includes one of the opposing electrodes provided on a substrate, and the other electrode provided to a displacement portion made of an elastic material such as rubber. When a user presses the displacement portion upon an input operation, a distance between the electrodes narrows, and the capacitance produced between the electrodes increases. Further, the input device detects a pressing position and a pressing force based on the change (increase) in this capacitance.

PTL 1: Japanese Patent Application Laid Open No. 2006-178742.

When the pressing force applied to the displacement portion in the input device described in Patent Literature 1 is low, the displacement portion is not sufficiently displaced to prevent narrowing of the distance between the electrodes, and the capacitance between the electrodes hardly changes. Hence, the input device described in Patent Literature 1 has a problem that, when the displacement portion is not pressed by a user with sufficient force upon an input operation, it is not possible to obtain a sufficient change amount in capacitance for detecting the pressing force so that neither the pressing force nor the pressing position can be detected.

SUMMARY OF THE INVENTION

It is therefore an object of the present invention to provide a detecting sensor that reliably receives a user's input operation and precisely detects an input position and pressing force, and an input device.

According to an exemplary embodiment, the sensor includes a first flexible board and first and second surfaces are opposite to each other. The sensor further includes a plurality of position detection electrodes provided on the first surface at a distance in a planar direction; an insulating film provided on the first surface that covers the plurality of position detection electrodes; a pressing force detection first electrode provided on the second surface; and a pressing force detection second electrode provided to oppose to the pressing force detection first electrode.

According to this configuration, it is possible to independently detect an input position and a pressing force applied to the first board. When a user's finger touches the insulating film, a capacitance is produced between the finger and the position detection electrode. Consequently, it is possible to detect the pressing position based on a change in this capacitance. Further, when the user presses the first board, a distance between the pressing force detection first electrode and the plurality of pressing force detection second electrodes decreases, and the capacitance produced between the electrodes changes (increases). It is possible to detect the pressing force based on a change in this capacitance. Consequently, even when there is not a user's pressing force, if the user's finger touches the insulating film, it is possible to precisely detect an input position. Consequently, the detecting sensor according to the present invention can reliably receive a user's input operation and precisely detect an input position, and detect the pressing force when there is a pressing force.

According to the present invention, preferably a second board which opposes the second surface and is provided at a distance from the first board is provided, and the pressing force detection second electrode is provided on a surface of the second board, the surface being on a side of the first board.

According to this configuration, it is possible to form a circuit pattern on the second board and, consequently, provide a control integrated circuit ("IC") that detects the input position and the pressing force, on one of the first board and the second board.

Preferably, the plurality of position detection electrodes include a first position detection electrode, and a plurality of second position detection electrodes provided to surround the first position detection electrode, and one of the first position detection electrode and the plurality of second position detection electrodes is connected to a ground, and the other one of the first position detection electrode and the plurality of second position detection electrodes is connected to a voltage source.

According to this configuration, when the user's finger touches the insulating film, capacitances are produced between the finger and the first position detection electrode and between the finger and the second position detection electrodes. Consequently, a change in the capacitances produced upon a touch is great and it is possible to detect the change in the capacitances and, consequently, precisely detect an input position.

According to the present disclosure, it is possible to reliably receive a user's input operation and precisely detect an input position and a pressing force.

DETAILED DESCRIPTION

A detecting sensor according to the present disclosure will be described below. Each embodiment below will be described as an input device which includes the detecting sensor.

(First Embodiment)

Figure 1:
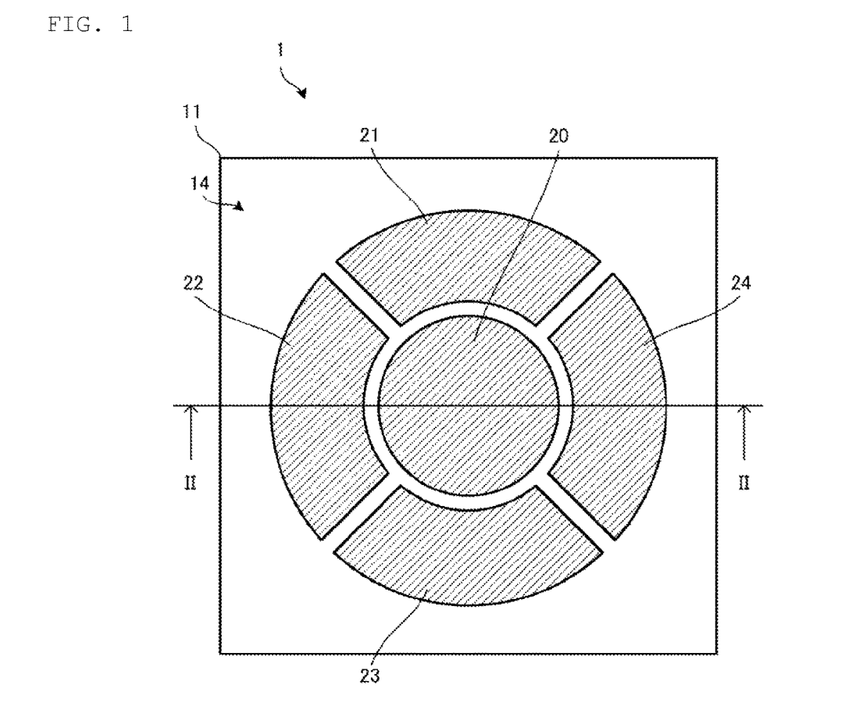
FIG. 1 is a plan view of an input device according to a first embodiment.
Figure 2:
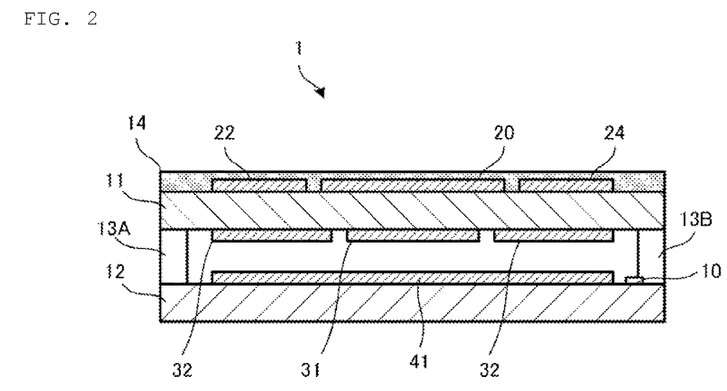
FIG. 2 is a sectional view taken along a line II-II in FIG. 1.

FIG. 1 is a plan view of an input device according to the first embodiment. FIG. 2 is a sectional view taken along a line II-II in FIG. 1. An input device 1 is used as a device for receiving an operation of, for example, a mobile telephone, a portable music player and a controller of an electronic device. A user performs an operation via the input device 1 to move a cursor to input characters in the case of, for example, a mobile telephone or to increase or decrease a sound volume (change a channel) in the case of the controller.

The input device 1 includes printed circuit boards (referred to as "boards" below) 11 and 12 of rectangular shapes. The board 11 corresponds to a first board as described herein, and the board 12 corresponds to a second board as described herein. The board 12 is mounted on a device on which the input device 1 is mounted such as a main board of a mobile telephone or the like. Spacers 13A and 13B are provided on the board 12, and the board 11 is supported by the spacers 13A and 13B to oppose to the board 12 at a distance. FIG. 2 illustrates only the two spacers 13A and 13B, yet spacers are provided at four angular portions of the boards 11 and 12 of the rectangular shapes according to the exemplary embodiment.

When the input device 1 is mounted on the mobile telephone or the like, a surface of the board 11 which receives a user's operation is exposed from a housing of the mobile telephone. The user presses the board 11 to input an operation to the input device 1. The board 12 is provided with a control IC 10 which detects a user's press. More specifically, the control IC 10 detects a position on the board 11 (referred to as an input position below) which the user touches, and a press amount (referred to as a pressing force) on the board 11 obtained when the board 11 is pressed.

An electrode 20 having a circular shape is provided at a substantially center of a surface of the board 11, and electrodes 21 to 24 having arc shapes are provided around the electrode 20 to surround the electrode 20 as shown in FIG. 1. The electrodes 20 to 24 are provided at distances in planar directions. Planes of the electrode 20 and the electrodes 21 to 24 do not oppose to each other yet are disposed close to each other, and capacitances are produced a little between the electrode 20 and the electrodes 21 to 24. An insulator film 14 such as resist or a film is formed on the surface of the board 11 to cover the electrodes 20 to 24.

The electrode 20 is connected to a reference potential of the input device 1. The electrodes 21 to 24 are connected to a detection voltage applying terminal or a detection voltage output terminal. Since a user's finger behaves as a conductor at a low frequency when touching the surface of the board 11, capacitances are produced between the finger and the electrodes 20 and 24 with the insulator film 14 interposed therebetween formed on the surface of the board 11. More specifically, the capacitance produced by a configuration where the insulator film 14 is sandwiched between the electrode 20 and the finger is connected in series with the capacitance produced by a configuration where the insulator film 14 is sandwiched between one of the electrodes 21 to 24 and the finger. These capacitances are used by the control IC 10 to detect an input position when the user presses the surface of the board 11. According to the exemplary embodiment, the insulator film 14 preferably has such a thickness of 100 μm or less that the capacitance produced between the finger and the electrodes 20 to 24 is not reduced. A method of detecting an input position will be described in detail below.

Figure 3:
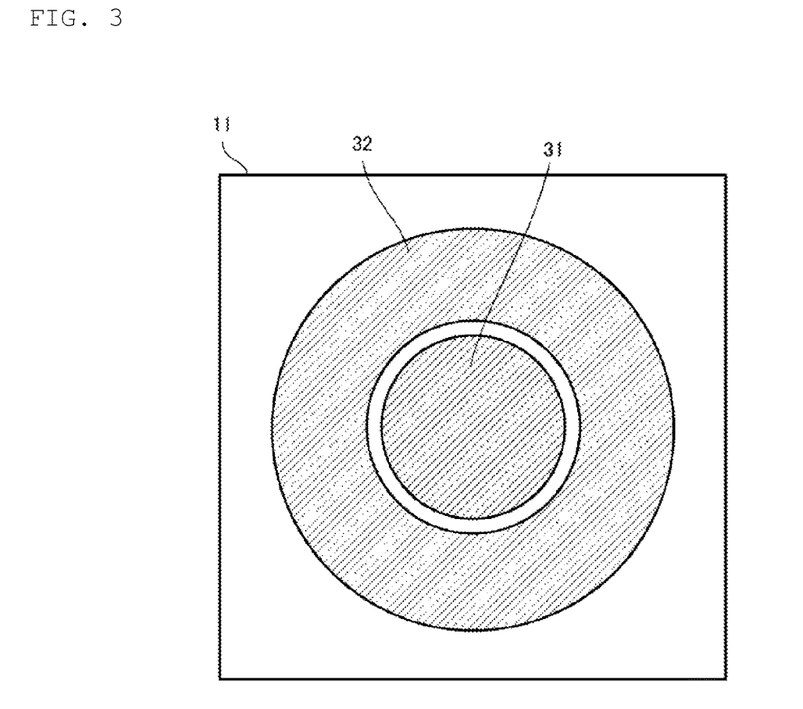
FIG. 3 is a plan view of a board illustrating a pressing force detection electrode.

Pressing force detection electrodes 31 and 32 are formed on a back surface of the board 11. FIG. 3 is a plan view of the board 11 illustrating the pressing force detection electrodes 31 and 32. The electrode 31 has a circular shape in planar view, and is formed to have the same center point as that of the electrode 20 provided on the surface of the board 11. The electrode 32 has an annular shape which surrounds the electrode 31, and is formed to have the same center point as that of the electrode 31. Further, the electrode 32 has the same diameter as that of a circular shape which would be formed if the electrodes 21 to 24 are combined.

The electrode 31 is connected to the reference potential of the input device 1. The electrode 32 is connected to the detection voltage applying terminal or the detection voltage output terminal. Further, capacitances are produced between the electrodes 31 and 32 and an electrode 41. More specifically, the capacitance produced between the electrodes 31 and 41 is connected in series with the capacitance produced between the electrodes 32 and 41. These capacitances are used by the control IC 10 to detect a pressing force when the user presses the surface of the board 11.

Further, the electrode 41 that opposes the electrodes 31 and 32 is formed on the surface of the board 12. Capacitances are produced between the electrodes 41 and 31 and between the electrodes 32 and 41. According to the exemplary embodiment, the board 11 is flexible and deflects toward the board 12 when the surface of the board 11 is pressed by the user's finger or the like. When the board 11 deflects, distances between the electrodes 31 and 32 and the electrode 41 are reduced, and the capacitances produced between the electrodes change (increase). The control IC 10 detects a pressing force applied to the board 11 by detecting the change in these capacitances.

In addition, an elastic body may be provided between the boards 11 and 12 without causing interference with the deflection of the board 11. In this case, the elastic body is preferably made of a material whose relative permittivity is larger than 1. By increasing the capacitances, the control IC 10 can more precisely detect the pressing force applied to the board 11.

Detection of an input position and detection of a pressing force performed by the control IC 10 in the case where the user presses the board 11 will be more specifically described below.

Figure 4:
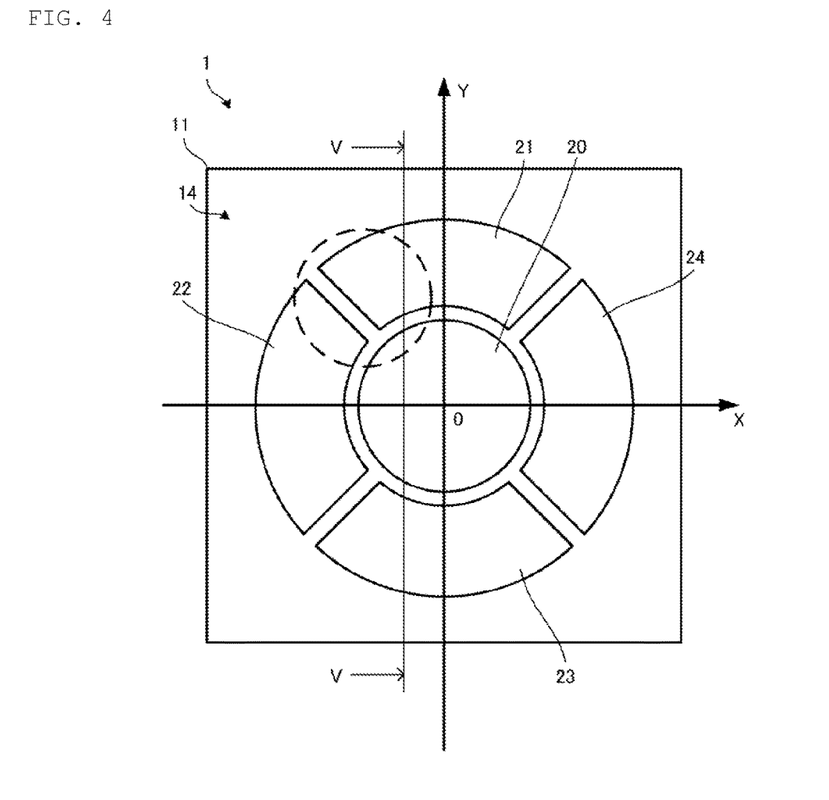
FIG. 4 is a view for explaining a detecting method for detecting an input position on the board.
Figure 5:
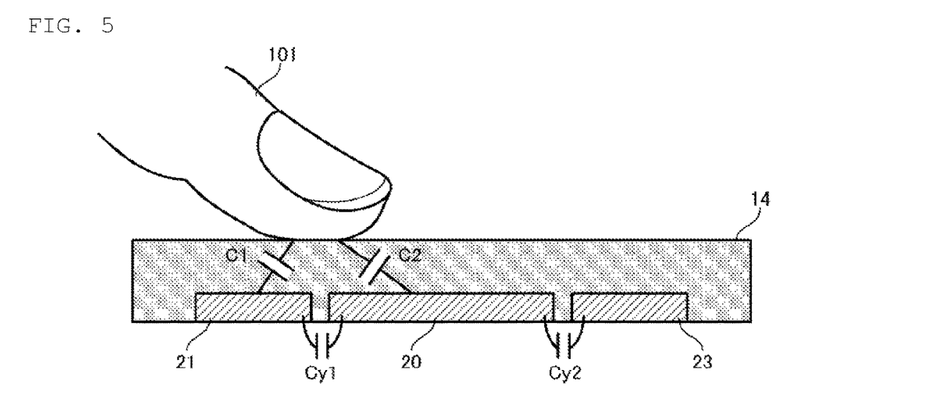
FIG. 5 is a sectional view taken along a line V-V in FIG. 4.

FIG. 4 is a view for explaining a detecting method for detecting an input position on the board 11. FIG. 5 is a sectional view taken along a line V-V in FIG. 4.

In FIG. 4, a center point of the electrode 25 is an origin 0, and a straight line passing the electrodes 22 and 24 is an X axis, and a straight line passing the electrodes 21 and 23 is a Y axis. Further, a direction of the electrode 24 is a positive direction on the X axis, and a direction of the electrode 21 is a positive direction on the Y axis. The control IC 10 detects an input position by detecting which one of the electrodes 21 to 24 has received an input. In the case where, for example, the electrode 21 has received an input, the control IC 10 detects that the input position is in the positive direction on the X axis. In FIG. 4, a broken line circle portion receives an input by the user.

As described above, capacitances are produced between the electrode 20 and the electrodes 21 to 24. As illustrated in, for example, FIG. 5, a capacitance Cy1 is produced between the electrode 20 and the electrode 21, and a capacitance Cy2 is produced between the electrode 20 and the electrode 23. When the board 11 does not receive an input, a capacitance ratio (voltage ratio) between the capacitances Cy1 and Cy2 does not change.

When a finger 101 of a user touches the insulator film 14, which is a surface of the board 11, as illustrated in FIG. 5, a capacitance C1 is produced between the finger 101 of the user and the electrode 21, and a capacitance C2 is produced between the finger 101 of the user and the electrode 20. Hence, the capacitance produced between the electrode 20 and the electrode 21 is increased by the produced capacitances C1 and C2, and a ratio of the capacitance between the electrodes 20 and 21 to the capacitance between the electrodes 20 and 23 (capacitance ratio) changes. That is, the control IC 10 calculates a difference between the capacitances and, when the capacitance between the electrodes 20 and 21 is high, detects that the electrode 21 has received a user's input and that an input has been received at a positive side in the Y axis direction.

The control IC 10 separately executes detection of the position in the X axis direction and detection of the position in the Y axis direction. For example, connection with the control IC 10 is switched by way of time division. Thus, it is possible to accurately perform detection in each direction separately.

The same applies to the X axis, and, when a broken line circle portion in FIG. 4 is pressed, a capacitance is produced between the finger 101 of the user and the electrode 22, and a ratio of the capacitance between the electrodes 20 and 22 to the capacitance between the electrodes 20 and 24 changes. That is, the capacitance between the electrodes 20 and 22 is higher than the capacitance between the electrodes 20 and 24. As a result, the control IC 10 detects that the electrode 22 has received a user's input and that an input has been received at a negative side in the X axis direction.

The control IC 10 outputs the detected input position to an outside of the input device 1. Further, the device on which the input device 1 is mounted such as the mobile telephone performs an operation of moving the cursor in the same direction as an input direction.

Thus, when the finger 101 of the user touches the surface of the board 11, the capacitances are produced between the finger 101 and the electrodes 20 to 24. Consequently, even when such a pressing force is applied that does not deflect the board 11, the control IC 10 can detect a touch position. Consequently, the input device 1 can reliably receive a user's operation.

Figure 6:
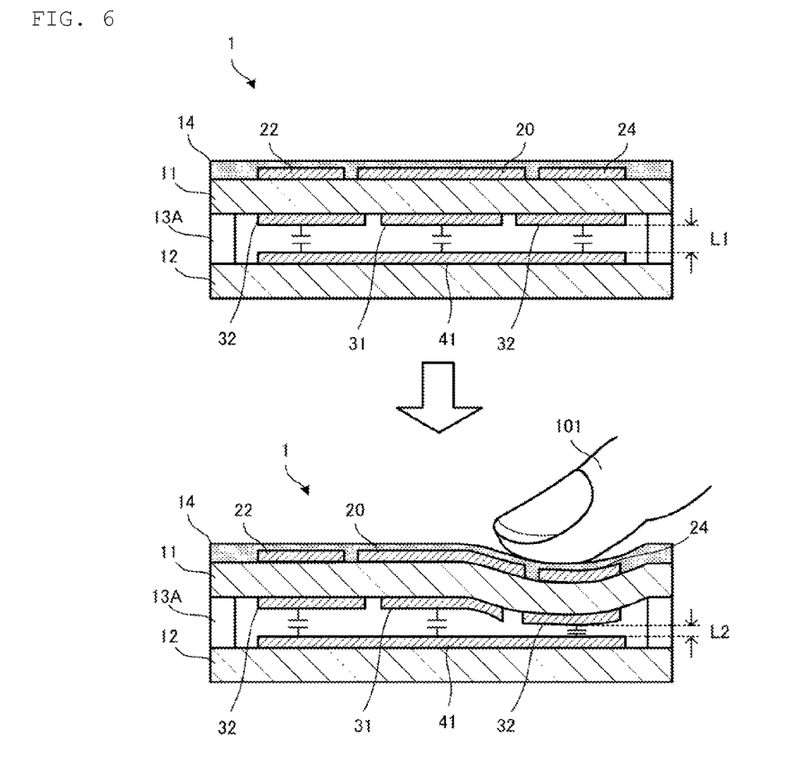
FIG. 6 is a view for explaining a detecting method for detecting a pressing force applied to the board.

FIG. 6 is a view for explaining a detecting method for detecting a pressing force applied to the board 11. An upper portion in FIG. 6 illustrates a state before the board 11 is pressed, and a lower portion in FIG. 6 illustrates a state after the board 11 is pressed.

As described above, capacitances are produced between the opposing electrodes 31 and 32 and the electrode 41. A distance between the electrodes 31 and 32 and the electrode 41 is L1 before the board 11 is pressed. When the user presses the board 11, a portion of the board 11 pressed by the finger 101 deflects toward the board 12. A distance between the electrodes 32 and 41 in this case is L2. Thus, L1>L2 holds, and when the board 11 is pressed by the user, capacitances produced between the electrodes 31 and 32 and the electrode 41 increase. The control IC 10 detects a change in the capacitances, and calculates a pressing force of the user based on the change amount.

The control IC 10 outputs the detected pressing force to the outside of the input device 1. Further, in an embodiment where the input device 1 is mounted, for example, as a controller of a television, an operation of continuing increasing (continuing decreasing) a sound volume is performed according to a pressing force.

Note that the board 11 has a different displacement amount according to a pressing position. For example, deflection amounts of the board 11 differ for a case where a center of the board 11 is pressed and a case where vicinities of the spacers 13A and 13B are pressed with the same force. Changes in the capacitances upon a press also differ. Hence, the control IC 10 may correct a pressing force to detect according to a pressing position by using a correction value stored in advance.

As described above, the input device 1 according to the present embodiment can detect an input position and a pressing force of a user applied to the board 11. Further, even when the board 11 is not pressed with sufficient force, if the user's finger touches the surface of the board 11, the input device 1 can detect an input position of the user's finger and reliably receive a user's operation.

In the present embodiment, the board 12 on which the electrode 41 is provided is a printed board. However, a base material on which a wiring pattern is not formed may be used. In this case, the control IC 10 may be provided to the board 11.

(Second Embodiment)

Figure 7:
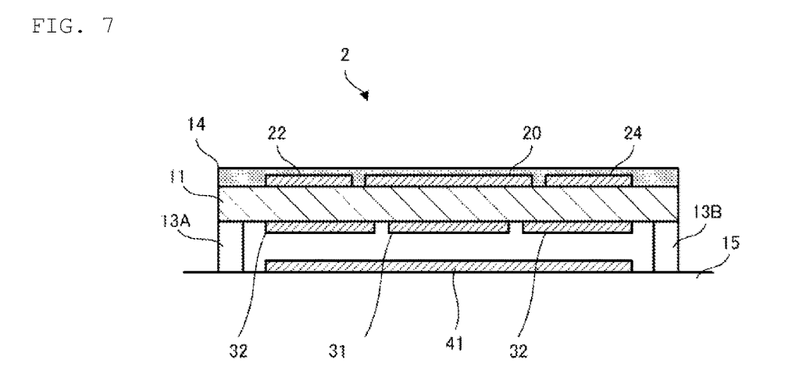
FIG. 7 is a sectional view of an input device according to a second embodiment.

FIG. 7 is a sectional view of an input device according to the second embodiment. An input device 2 according to the present embodiment adopts the same structure as that of the first embodiment. However, the second embodiment differs from the first embodiment in that an electrode 41 which detects a pressing force is provided to a device on which the input device 2 is mounted such as a main board 15 of a mobile telephone or the like. In this case, a voltage VDD may be applied to each electrode from a voltage source of the mobile telephone or the like, and a control IC which controls the mobile telephone may detect an input position and a pressing force on a board 11.

Thus, the input device 2 according to the present embodiment can detect an input position and a pressing force of the user applied to the board 11 similarly to the first embodiment. Further, even when the board 11 is not pressed with sufficient force, if the user's finger touches the surface of the board 11, the input device 2 can detect an input position of the user's finger and reliably receive a user's operation.

In an alternative embodiment, electrodes 31 and 32 may be combined as one electrode as a modification to the configurations of the first and second embodiments. In this case, one of the one electrode and the electrode 41 is connected to a ground, and the other one of the one electrode and the electrode 41 is applied with the voltage VDD. Further, although an electrode 20 is connected to a ground and the voltage VDD is applied to electrodes 21 to 24 in the first and second embodiments, the electrodes 21 to 24 may be connected to the ground and the voltage VDD may be applied to the electrode 20. Further, the number of electrodes which detect an input position is not limited to the four electrodes 21 to 24 and may be two, three or five or more. By, for example, providing eight electrodes around the electrode 20, it is possible to detect a more precise input position based on an origin.

DESCRIPTION OF REFERENCE SYMBOLS

1, 2 INPUT DEVICE
10 CONTROL IC
11 BOARD (FIRST BOARD)

12 BOARD (SECOND BOARD)
13A, 13B SPACER
14 INSULATOR FILM (INSULATING FILM)
15 MAIN BOARD
20 to 24 ELECTRODE (POSITION DETECTION ELECTRODE)
31 ELECTRODE (PRESSING FORCE DETECTION FIRST ELECTRODE, FIRST POSITION DETECTION ELECTRODE)
32 ELECTRODE (PRESSING FORCE DETECTION FIRST ELECTRODE, SECOND POSITION DETECTION ELECTRODE)
41 ELECTRODE (PRESSING FORCE DETECTION SECOND ELECTRODE)
101 FINGER
C1, C2 CAPACITANCE
Cy1, Cy2 CAPACITANCE

The invention claimed is:

1. A detecting sensor, comprising:
a flexible first board having opposed first and second surfaces;
a plurality of spaced position detection electrodes located on the first surface;
an insulating film located on the first surface and covering the plurality of position detection electrodes;
a first pressing force detection electrode located on the second surface;
a second pressing force detection electrode which is spaced from and opposes the first pressing force electrode, the second pressing force electrode being located on a second board which faces and is spaced apart from the second surface of the first board; and
a control integrated circuit located on the second board, the control integrated circuit being coupled to the position detection electrodes and the first and second pressing force detection electrodes and determining the location of a touch input position and a pressing force applied to the detecting sensor as a function of capacitances associated with the electrodes.

2. The detecting sensor according to claim 1, wherein the plurality of position detection electrodes are disposed in a common plane with spaces between each of the plurality of position detection electrodes.

3. The detecting sensor according to claim 1, further comprising a plurality of spacers disposed on the second board to space the second board from the first board.

4. The detecting sensor according to claim 1, wherein the plurality of position detection electrodes include a center position detection electrode and a plurality of surrounding position detection electrodes which surround the center position detection electrode.

5. The detecting sensor according to claim 4, wherein the center position detection electrode is circular in shape and is disposed at a center of the first surface of the first board.

6. The detecting sensor according to claim 5, wherein the surrounding position detection electrodes are arcuate in shape and surround the central position detection electrode.

7. The detecting sensor according to claim 4, wherein one of either the central position detection electrode or the plurality of surrounding position detection electrodes is connected to a ground, and the other of the central position detection electrode and the plurality of surrounding position detection electrodes is connected to a voltage source.

8. The detecting sensor according to claim 1, wherein the first force detection electrode comprises a pair of force detection electrodes.

9. The detecting sensor according to claim 8, wherein a first electrode of the pair of force detection electrodes has a circular shape in a planar view with a same center point as a central electrode of the plurality of position detection electrodes.

10. The detecting sensor according to claim 9, wherein a second electrode of the pair of force detection electrodes has an annular shape and surrounds the first electrode of the pair of force detection electrodes.

11. The detecting sensor according to claim 1, wherein the integrated circuit detects the location of the touch input position as a function of a change in capacitance between a user's finger which inputs the touch input position and at least one of the plurality of position detecting electrodes.

12. The detecting sensor according to claim 11, wherein the integrated circuit detects the pressing force based on a change in capacitance between the first and second force detection electrodes.

13. The detecting sensor according to claim 1, wherein the insulator film has a thickness of 100 μm or less.

14. An input device, comprising:
the detecting sensor according to claim 1; and
means to receive an input of a signal corresponding to a detection result of the detecting sensor.

15. A detecting sensor, comprising:
a flexible first board having opposed first and second surfaces;
a central position detection electrode having a circular shape and being located on the first surface;
a plurality of surrounding position detection electrodes located on the first surface and surrounding the first position detection electrode;
an insulating film located on the first surface and covering the position detection electrodes;
a circular first pressing detection electrode and a surrounding first pressing detection electrode located on the second surface, the surrounding first pressing force electrode surrounding the circular first pressing detection electrode;
a second pressing force detection electrode which is spaced from and opposes both the circular and annular first pressing force electrodes, the second pressing force electrode being located on a second board which faces and is spaced apart from the second surface of the first board; and
a control integrated circuit located on the second board, the control integrated circuit being coupled to the position detection electrodes and the first and second pressing force detection electrodes and determining the location of a touch input position and a pressing force applied to the detecting sensor as a function of capacitances associated with the electrodes.

16. The detecting sensor according to claim 15, wherein one of either the central position detection electrode or the plurality of surrounding position detection electrodes is connected to a ground, and the other of the central position detection electrode and the plurality of surrounding position detection electrodes is connected to a voltage source.

17. The detecting sensor according to claim 15, wherein the integrated circuit detects the location of the touch input position as a function of a change in capacitance between a user's finger which inputs the touch input position and at least one of the plurality of position detecting electrodes.

18. The detecting sensor according to claim 17, wherein the integrated circuit is configured to detect the pressing force based on a change in capacitance between the first and second force detection electrodes.

19. The detecting sensor according to claim 15, wherein the insulator film has a thickness of 100 μm or less.

* * * * *